Figure 2:
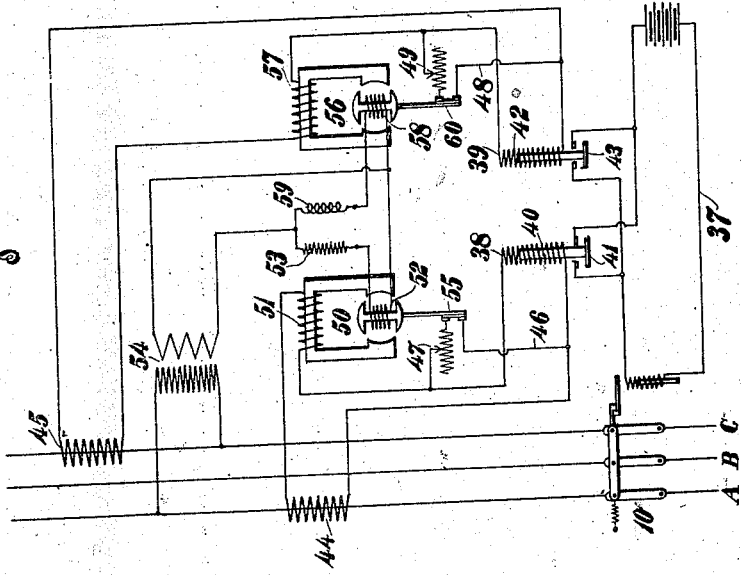

H. L. VAN VALKENBURG.
SYSTEM OF DISTRIBUTION.
APPLICATION FILED AUG. 31, 1906.

932,072.

Patented Aug. 24, 1909.

Witnesses
Oliver W. Harman
Fred J. Kinsey

Inventor
Hermon L. Van Valkenburg
By
Chas. E. Lord
Attorney

UNITED STATES PATENT OFFICE.

HERMON L. VAN VALKENBURG, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SYSTEM OF DISTRIBUTION.

932,072.  Specification of Letters Patent.  Patented Aug. 24, 1909.

Application filed August 31, 1906. Serial No. 332,762.

*To all whom it may concern:*

Be it known that I, HERMON L. VAN VALKENBURG, citizen of the United States, residing at Norwood, in the county of Hamilton and State of Ohio, have invented certain new and useful Improvements in Systems for Distribution, of which the following is a full, clear, and exact specification.

My invention relates to automatic switches or circuit-breakers for controlling or protecting electric circuits, particularly high voltage alternating current circuits.

One of the objects of my invention is to provide reliable means for protecting the circuits against abnormal line conditions, particularly overloads and reversals of current, which protecting means is inexpensive, simple, and reliable.

A further object is to provide a relay for the tripping circuits of switches or circuit-breakers which will operate on the occurrence of a predetermined excessive current in the normal direction, and on the occurrence of a reversal of current or a predetermined excess of current in the reverse direction, adjusting means being provided so that the relay can be made to operate at different relative values of the current in the normal direction or abnormal direction.

A still further object is to provide a reverse current and overload relay which will open the main circuit when the currents in the normal direction and in the abnormal direction respectively reach definite predetermined values regardless of the power factor or of the values of voltage, provided the value of the voltage is sufficient to operate the relay.

In carrying out my invention, I provide a relay containing a magnet responsive to an abnormal line condition, and provide a circuit or by-path for the current around the coil, which by-path is controlled by a device responsive to another abnormal line condition.

Considering my invention more specifically, I provide an overload or overload time limit relay containing a magnet which on the occurrence of an excessive current in the normal direction will respond so as to cause the circuit-breaker or switch in the main line to be opened, as by closing a circuit through the trip coil. Around the relay magnet I provide a circuit containing a resistance which is preferably adjustable, and further provide a device responsive to a reversal of current for controlling the circuit around the relay, so that on the occurrence of a reversal of energy said circuit is broken, causing an increase of current to pass through the relay magnet.

My invention still further consists in the combinations and arrangements of parts described in the specification and set forth in the appended claims.

For a better understanding of my invention, reference is had to the accompanying drawings in which—

Figure 1:
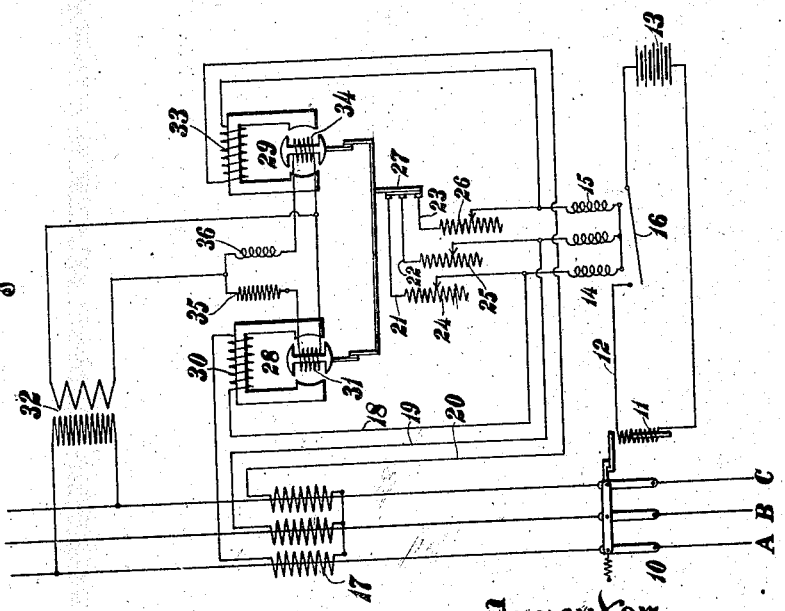

Figure 1 is a diagrammatic representation showing my invention applied to a three-phase alternating current circuit; and Fig. 2 is a similar view of a slight modification of my invention.

Referring now to Fig. 1 of the drawing, A, B, and C represent a three-phase distributing circuit containing an automatic circuit breaker or oil switch represented somewhat conventionally at 10. The circuit-breaker or switch is provided with a tripping coil 11, located in this instance in a local, normally open circuit 12 connected to a separate source of current 13. If desired, however, the tripping circuit may be connected to the main distributing circuit instead of to the separate source 13. I have provided means for automatically closing the tripping circuit on the occurrence of abnormal line conditions, in this case on the occurrence of overloads or reversals of current. In this instance this is accomplished by means of an overload or overload time limit relay 14 consisting of a three-phase magnet composed of three coils 15 and a movable armature 16 which is a movable member of a normally open switch located in the circuit of the tripping coil 11. The three coils of the relay are connected to the three distributing mains A, B, and C, in this instance by current transformers 17 and three conductors 18, 19, and 20. Connected around the coils 15 of the relay magnet 14 so as to form by-paths for the current around the coils are three circuits 21, 22 and 23 containing adjustable resistances or rheostats 24, 25, and 26, which circuits are adapted to be opened simultaneously by a switch 27, which is controlled, in this case, by either of two reverse current relays 28 and 29.

The reverse current relay 28 is provided with a series or current coil 30 located in the conductor 18 and in series with the secondary of the series transformer in conductor A of the main circuit, and a movable potential coil 31 connected across the conductors A and C by means of a potential transformer 32. The reverse current relay 29 is provided with a series or current coil 33 in the conductor 20 and in series with the secondary of the series transformer in conductor C of the main distributing circuit, and a movable potential coil 34 also connected to the secondary of the potential transformer 32. It is seen that the two potential coils are in parallel. If desired, however, the potential coils may be connected to separate potential transformers.

In series with the potential coil 31 of relay 28 is an ohmic resistance 35, and in series with potential coil 34 of relay 29 is an inductive resistance 36. By properly proportioning the ohmic and inductive resistances, the currents in the movable voltage coils of the relays can be made to bear any desired phase relation to the electromotive force in the main circuit, so as to obtain sufficient torque between the two magnetic fields to operate the relay at the instant of reversal regardless of the power factor in the main circuit. The two resistances are preferably so adjusted or proportioned that when the power factor in the main circuit is unity the currents in the potential coils of the reverse current relays are made to lag such an amount behind the currents in the series or current coils 30 and 33 respectively, as to be approximately midway between the probable limits of the phase displacements of the current in the main circuit. The result is that even in case the power factor in the main circuit is zero, or the current is displaced 90° from the electromotive force, the difference in phase of the currents in either pair of coils of the reverse current relay is less than 90°, and hence in the normal operation of the system the cosine of the angle of lag of the current in one coil from the current in the other is never zero. The reverse current relays are preferably made very sensitive so as to be able to operate on very low values of current or voltage.

It is seen that when the current in the main circuit is in the normal direction a certain proportion of the current in the conductors 18, 19 and 20 is shunted around the overload relay coils, and when a reversal of current occurs in the main circuit the shunt circuits around the relay coils are broken and all the current in conductors 18, 19 and 20 passes through the overload relay coils. Therefore the relative values of the currents in the main circuit necessary to operate the overload relay when the currents are in the normal direction and when in the reverse direction depends on the relative resistances of the relay coils and the shunt circuits around the relay coils. By adjusting the resistances 24, 25, and 26 in the shunt circuits, the relative values of the currents necessary to operate the overload relay can be changed. When once the overload relay and resistances of the shunt circuits have been adjusted to trip the switch or circuit-breaker at certain desired values of currents in the normal and reverse direction, these values will remain constant regardless of changes in the power factor and changes in voltage in the main circuit, provided the voltage is sufficient to operate the reverse current relays, which, as was stated before, are made very sensitive. In many overload and reverse current relays heretofore employed, particularly the differential relays having a current coil and a potential coil which create fields which oppose each other when the current is in the normal direction and assist each other on a reversal of current, the values of the current in the main circuit necessary to trip the switch or circuit-breaker are not constant but vary materially with the power factor and changes of voltage.

In Fig. 2 I have shown a slight modification. The main distributing conductors A, B, and C are provided with a switch or circuit breaker 10 as in the first case. A tripping circuit 37, however, in this case is adapted to be closed by either one of two separate overload or overload time limit relays 38 or 39. In this case relay 38 consists of a single solenoid coil 40 and a plunger 41 which carries a movable switch contact for the tripping circuit, and relay 39 consists of a single solenoid coil 42 and plunger 43, which likewise carries a movable switch contact. Coil 40 is connected to the secondary of a series transformer 44 located in conductor A of the main distributing circuit, and coil 42 is connected to the secondary of a series transformer 45 located in conductor C of the main distributing circuit. At 46 is shown a circuit containing an adjustable resistance or rheostat 47 connected across coil 40 of relay 38, and at 48 is shown a circuit containing an adjustable resistance or rheostat 49 connected across coil 42 of relay 39. At 50 is shown a reverse current relay consisting of a series or current coil 51 in circuit with coil 40 of relay 38 and series transformer 44, and a potential coil 52 connected through an ohmic resistance 53 to a potential transformer 54 connected across the main distributing conductors A and C. The potential coil 52 is located on a movable member which controls a switch 55 in the circuit 46 across the overload coil 40. At 56 is shown a second reverse current relay consisting of a series or current coil 57 in circuit with the coil 42 of overload relay 39 and transformer 45, and a movable potential coil 58 connected through an inductive resistance 59 to the potential transformer 54. The potential coil 58 is mounted on a movable member which controls a switch 60 located in the circuit 48 across the coil 42 of the overload relay 39. The operation of the circuit controlling devices here shown is substantially the same as in the arrangement shown in Fig. 1. In case an overload occurs in one or more of the phases of the main distributing circuit, one or both of the overload relays 38 and 39 close the circuit through the tripping coil, and in case there is a reversal of current in the main distributing circuit, one or both of the reverse current relays 50 and 56 operate one or both of the switches 55 and 60 in the circuit around the overload relay coils 40 and 42, so that one or both of the latter are actuated when the reverse current reaches a predetermined value. As in the first case, by properly proportioning the ohmic and inductive resistances 53 and 59 the phase of the current in the potential coil can be so adjusted relatively to the current in the series coil that there is always sufficient torque between the magnetic fields of the relays to open the switches 55 and 60 on the occurrence of a reversal of current regardless of the lag or lead of the current relative to the electromotive force in the main distributing conductors.

I have shown my invention applied to a three-phase alternating current circuit, but it is evident that it can as well be applied to a circuit of any other number of phases or to a direct current circuit.

Many changes may be made in the details without departing from the spirit and scope of my invention and I aim in my claims to cover all such modifications.

What I claim as new and desire to secure by Letters Patent is:

1. In combination, a switch or circuit-breaker, a magnet coil controlling the tripping of said circuit-breaker, a circuit in shunt to said magnet coil, and means for opening or closing said circuit responsive to the direction in which energy is transmitted through the switch or circuit-breaker.

2. In combination, a switch or circuit-breaker, a magnet coil controlling the tripping of said switch or circuit-breaker and responsive to an abnormal line condition, a circuit around said magnet coil, and means responsive to a reversal of current in the switch for controlling said circuit.

3. In combination, a switch or circuit-breaker, a magnet coil for controlling said circuit-breaker and responsive to a predetermined line condition, a circuit including an adjustable resistance in shunt to said magnet coil, and a device responsive to a reversal of current in the switch for controlling said shunt circuit.

4. In combination, a main distributing circuit, a switch or circuit-breaker having a tripping coil, a circuit therefor, means responsive to one abnormal condition in the distributing circuit for controlling said circuit, a shunt circuit around said means, and means responsive to a reversal of current in the distributing circuit for controlling said shunt circuit.

5. In combination, a main distributing circuit, a switch or circuit-breaker having a tripping coil, a circuit therefor, means responsive to one abnormal condition in the distributing circuit for controlling said circuit, a shunt circuit including an adjustable resistance connected around said means, and means responsive to a reversal of current in the distributing circuit for controlling said shunt circuit.

6. In combination, a main distributing circuit, a switch or circuit-breaker having a tripping coil, a circuit therefor, a device responsive to an excess of current in the main distributing circuit for controlling said tripping circuit, a shunt circuit around said means, and means responsive to a reversal of current in the main distributing circuit for controlling said shunt circuit.

7. In combination, a main distributing circuit, a switch or circuit breaker having a tripping coil, a normally open tripping circuit, an overload relay adapted to close said tripping circuit, a normally closed circuit including a rheostat or resistance around said overload relay, and a reverse current relay adapted to open said circuit on a reversal of current in the main distributing circuit.

8. In combination, an alternating current distributing circuit, a switch or circuit-breaker having a tripping coil, a normally open tripping circuit, one or more overload relays adapted to close said tripping circuit, a normally closed shunt circuit including a rheostat or resistance around each overload relay, and one or more reverse current relays adapted to open said shunt circuit or circuits on a reversal of current in the main distributing circuit.

9. In combination, a switch or circuit-breaker, a magnet coil controlling the tripping of said circuit-breaker, a circuit containing an adjustable resistance normally shunting said magnet coil, and means for opening said shunt circuit upon a reversal in the direction energy is transmitted through said switch or circuit-breaker.

10. In combination, a main distributing circuit, a switch or circuit-breaker in said circuit, a device responsive to an excess of current in said distributing circuit for controlling said switch or circuit-breaker, a circuit shunting said device, and means responsive to a reversal of current in the main circuit for opening the circuit shunting said device.

11. In combination, a main distributing circuit, a switch or circuit-breaker therein, an overload coil controlling the tripping of said circuit-breaker, a circuit including an adjustable resistance and normally shunting said overload coil, and means responsive to a reversal of energy in the main distributing circuit for opening said shunt circuit.

12. In combination, a main distributing circuit, a switch or circuit-breaker in said circuit, an overload coil controlling the tripping of said circuit-breaker, a shunt circuit for said overload coil, and means for closing or opening said shunt circuit according as the energy in the main distributing circuit is transmitted in the normal or abnormal direction.

13. In combination, a main distributing circuit, a switch or circuit-breaker in said circuit, an overload coil controlling the tripping of said circuit-breaker, a shunt circuit for said overload coil, an adjustable resistance in said shunt circuit, and means for closing or opening said shunt circuit according as the energy in the main distributing circuit is transmitted in the normal or abnormal direction.

In testimony whereof I affix my signature, in the presence of two witnesses.

HERMON L. VAN VALKENBURG.

Witnesses:
ARTHUR F. KWIS,
FRED J. KINSEY.